United States Patent [19]

Schmitt

[11] Patent Number: 4,825,980

[45] Date of Patent: May 2, 1989

[54] RAILROAD BRAKE SLACK ADJUSTERS

[75] Inventor: Eugene W. Schmitt, Lockport, Ill.

[73] Assignee: Sloan Valve Company, Franklin Park, Ill.

[21] Appl. No.: 579,260

[22] Filed: Feb. 13, 1984

[51] Int. Cl.⁴ .............................................. F16D 65/66
[52] U.S. Cl. ................................ 188/202; 188/196 D
[58] Field of Search .................... 188/196 D, 199, 202, 188/203

[56] References Cited

U.S. PATENT DOCUMENTS

| 3,177,985 | 4/1965 | Rauglas ................................ 188/202 |
| 3,900,086 | 8/1975 | Billeter ................................ 188/202 |
| 4,431,089 | 2/1984 | Nadas et al. .................... 188/196 D |

FOREIGN PATENT DOCUMENTS 3106178 9/1982 Fed. Rep. of Germany ...... 188/203

Primary Examiner—John W. Caldwell, Sr.
Assistant Examiner—Alvin Oberley
Attorney, Agent, or Firm—Kinzer, Plyer, Dorn, McEachran & Jambor

[57] ABSTRACT

A railroad slack adjuster has a threaded rod, one end of which is adapted to be connected to one portion of a railroad car brake rigging and a tube telescopic with the rod and adapted to be connected to another portion of the brake rigging. A clutch member is rotatably mounted on the rod for engagement with opposing clutch surfaces on the tube. A housing is telescopically positioned about the rod, tube and clutch member. There are springs positioned about the tube and effective between the tube and housing to urge the tube inwardly of the housing. There are further springs positioned about the rod and urging the rod inwardly of the tube. A brake application tension applied at opposite ends of the slack adjuster to the rod and tube cause the clutch member to move between the tube opposing clutch surfaces as the slack adjuster lets out and takes up slack in the brake rigging during brake application.

9 Claims, 2 Drawing Sheets

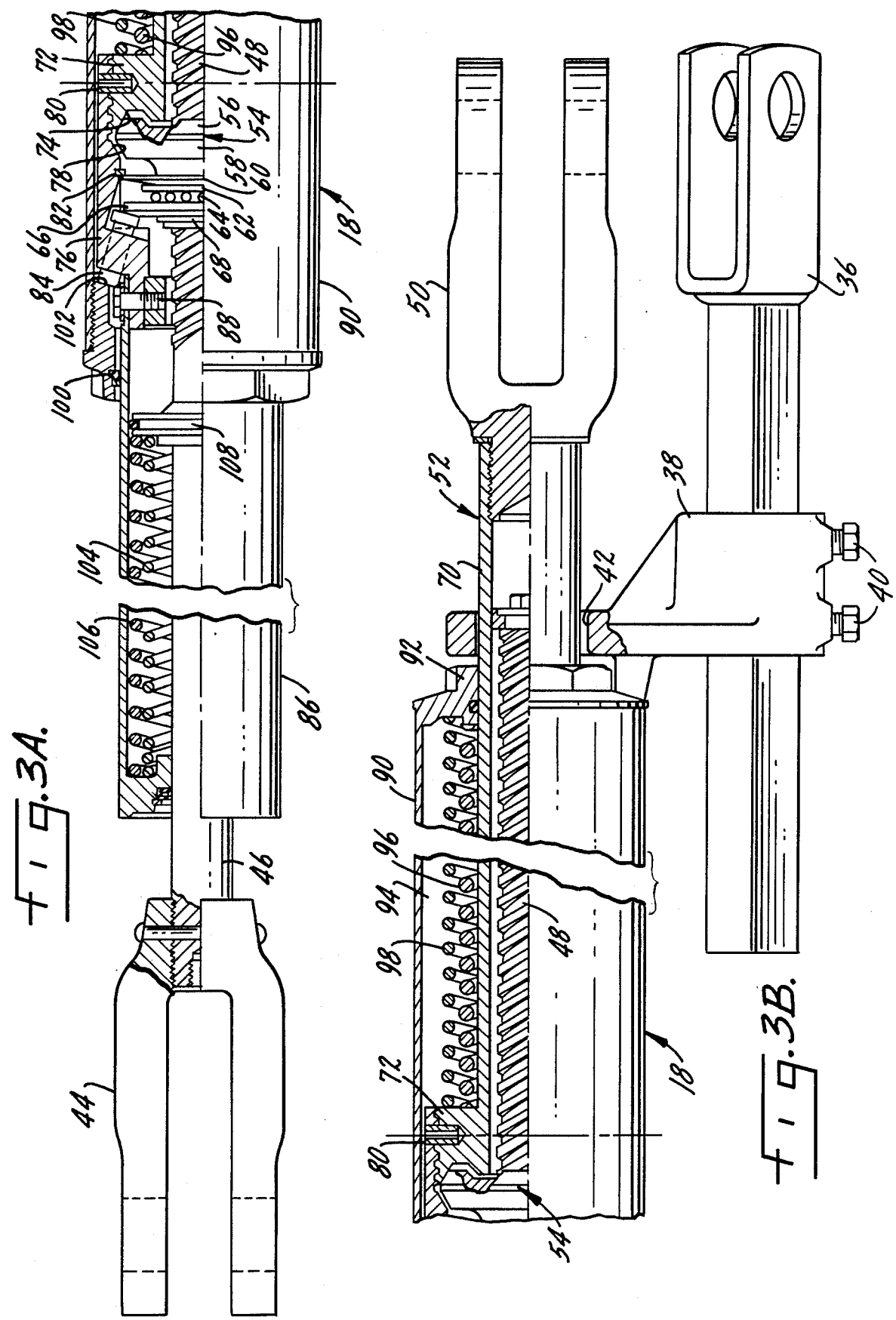

RAILROAD BRAKE SLACK ADJUSTERS

SUMMARY OF THE INVENTION

The present invention relates to slack adjusters of the type used in railroad freight cars and has particular application to a railroad freight car slack adjuster having a simplified construction.

A primary purpose of the invention is a slack adjuster for the described environment having a reduced number of parts and simplified operation to reliably take up and let out slack during brake application.

Another purpose is a slack adjuster of the type described including a threaded rod and a coaxially arranged tube mounted to opposed portions of the car brake rigging with the tube having opposing clutch surfaces designed to coact with a clutch member rotatably positioned upon the telescopic rod.

Another purpose is a slack adjuster of the type described which during brake application first lets out slack, prior to the time that the slack adjuster is locked into a fixed length, and then takes up slack upon release of the brake application tension.

Other purposes will appear in the ensuing specification, drawings and claims.

BRIEF DESCRIPTION OF THE DRAWINGS

The invention is illustrated diagrammatically in the following drawings wherein.

PRIOR ART

Prior patents of the assignee of the present application relating to brake slack adjusters of the general type disclosed herein are as follows: U.S. Pat. Nos. 3,249,183, 3,326,334, 3,326,335, 3,454,140, 3,595,347, 3,602,343 and 3,669,224.

DESCRIPTION OF THE PREFERRED EMBODIMENT

Figure 1:
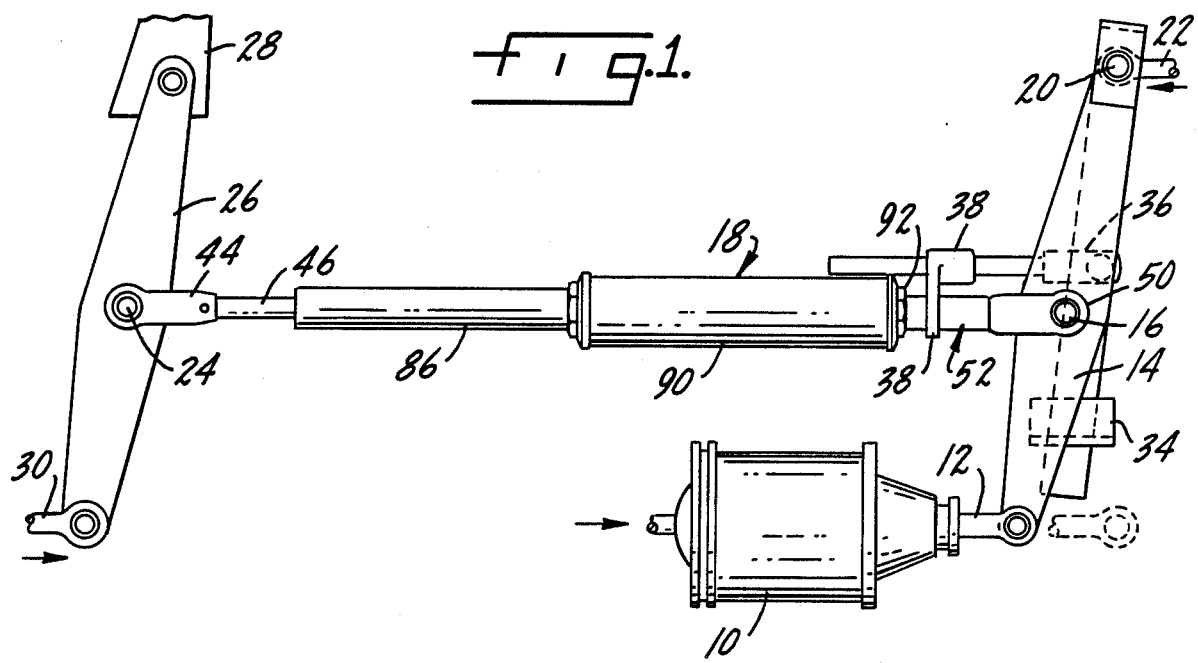
FIG. 1 is a diagrammatic illustration of a portion of a railroad freight car brake rigging, illustrating the slack adjuster disclosed herein.
Figure 2:
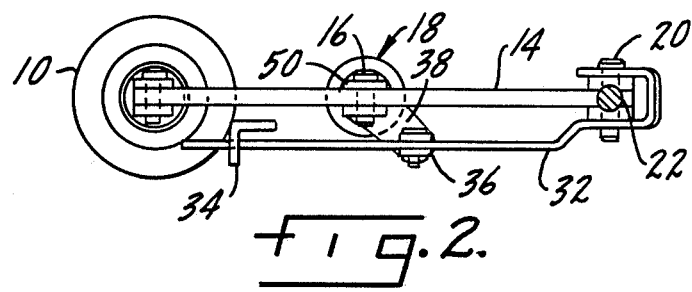
FIG. 2 is an end view of the right side of FIG. 1, FIGS. 3A and 3B are partial axial sections of the slack adjuster of FIG. 1.
Figure 4:
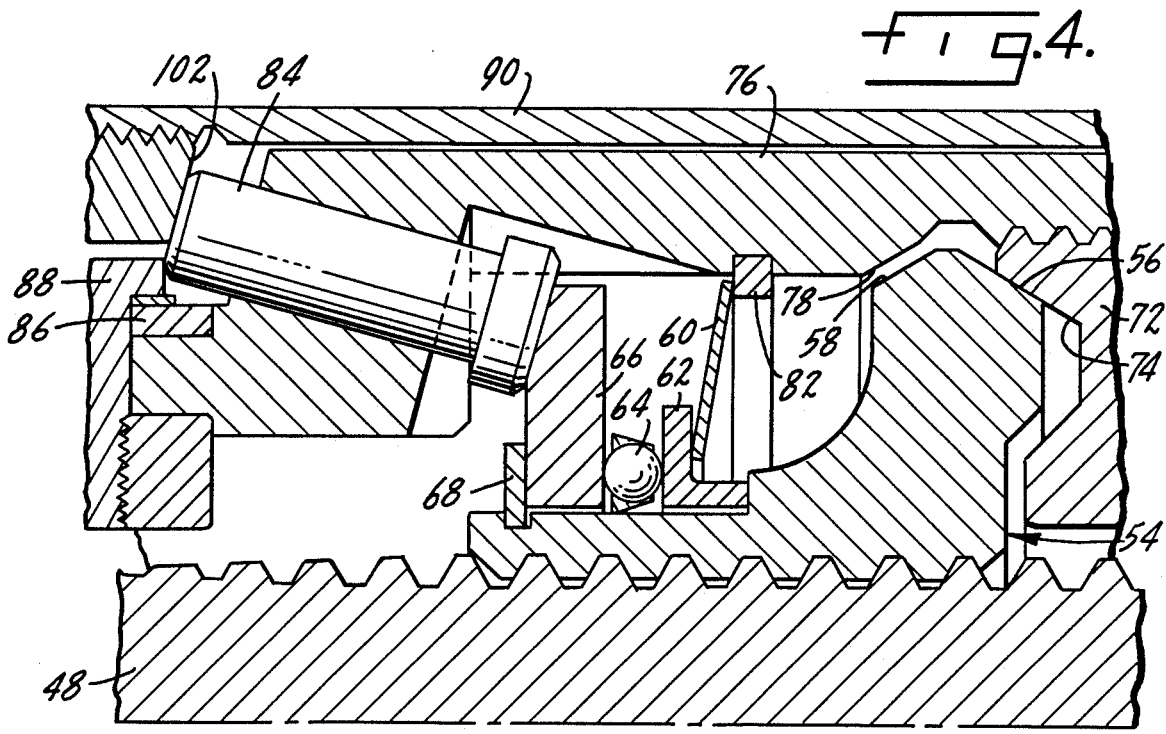
FIG. 4 is an enlarged view of a portion of FIG. 3A.

The railroad freight car brake rigging illustrated diagrammatically in FIGS. 1 and 2 includes a conventional brake cylinder 10 having a push rod 12 pivotally connected to a live lever 14. Live lever 14 is pivotally connected, as at 16, to one end of a slack adjuster assembly indicated generally at 18. The opposite end of live lever 14 is pivotally connected, as at 20, to a portion of the freight car brake rigging illustrated diagrammatically by rod 22. The opposite end of slack adjuster 18 is pivotally connected, as at 24, to the midpoint of dead lever 26, one end of which is pivotally connected to a fixed portion of the freight car frame indicated at 28. The opposite end of dead lever 26 is pivotally connected to a rod 30, representative of another portion of the freight car brake rigging.

An actuating lever 32 is positioned adjacent live lever 14 and pivotally attached to live lever 14 at pivot 20. The opposite end of actuating lever 32 is slidable in a bracket 34 supported on the railroad car frame.

Actuating lever 32 mounts an actuator 36 which carries an actuator bracket 38 which is adjustably positioned on actuator 36 by cap screws or the like 40. The actuator bracket, as particularly illustrated in FIGS. 3A and 3B, has an opening 42 which receives a portion of the slack adjuster, with the actuator bracket functioning to limit movement of a portion of the slack adjuster during operation thereof, as described hereinafter.

Slack adjuster 18 has a jaw 44 at one end thereof which forms the connection with dead lever 26 and is fixed upon a rod 46 having a threaded portion 48 thereon. The opposite end of the slack adjuster has a jaw 50 which forms the connection with live lever 14 and in turn is fixed to a pull rod tube assembly 52 which telescopically fits over rod 46. Tube assembly 52 extends within opening 42 in actuator bracket 38, as particularly illustrated in FIG. 3.

Threaded upon the threaded portion 48 of rod 46 is a clutch member 54 having oppositely facing clutch surfaces 56 and 58. Positioned on threaded portion 48 directly adjacent clutch member 54 in the position of FIG. 3A is a spring washer 60 which in turn is directly adjacent a thrust washer 62 and a thrust bearing 64. Positioned on the opposite side of thrust bearing 64 is a thrust plate 66 held in position by a retaining ring 68. Threaded portion 48 of rod 46 rotates relative to clutch member 54 and the bearing assembly described during operation of the slack adjuster.

Tube assembly 52 includes a portion 70 which is attached to jaw 50 and which has a flanged area 72 which forms a clutch face 74 opposed to clutch surface 56 of clutch member 54. Attached to portion 70 and forming a part of the tube assembly is a clutch housing 76 having a clutch face 78 opposed to clutch surface 58 of clutch member 54. A lock pin 80 may be used to attach the two described portions of the pull rod tube assembly together. A retaining ring 82 is mounted on the interior of clutch housing 76 and provides a stop for movement of spring washer 60.

Clutch housing 76 mounts a plurality, for example three, circumferentially spaced clutch pins 84 which are positioned for engagement with thrust plate 66, as will be described hereinafter. The pull rod tube assembly is completed by a main spring housing 86 which extends telescopically along rod 46 and is attached to clutch housing 76 by a plurality of circumferentially spaced cap screws 88. Thus, the pull rod tube assembly encloses a substantial portion of rod 46, as well as the clutch member, thrust bearings and thrust washer in addition to providing a platform for clutch pins 84.

Extending about a substantial portion of pull rod tube assembly 52 is a trigger barrel assembly 90, one end of which 92 is positioned for contact with actuator bracket 38. Positioned within a chamber 94 defined between the exterior of tube 70 and the interior of trigger barrel assembly 90 are a pair of coiled springs 96 and 98 which may be termed inner and outer trigger springs, respectively. The trigger springs are biased at one end upon the end of trigger barrel assembly 90 and at the other end are positioned against flange area 72 of the pull rod tube assembly. The trigger barrel assembly extends beyond the clutch construction described and extends over a portion of main spring housing 86, there being a wiper seal 100 formed therebetween. The trigger barrel assembly has a circumferential surface 102 positioned to bear against clutch pins 84 and apply a bias thereto.

Telescopically positioned about rod 46 are inner and outer main springs 104 and 106, respectively, which are held at one end by the end of main spring housing 86 and at the other end bear against an outwardly extending flange 108 fixed on rod 46. Thus, the main springs urge the rod inwardly, whereas, the trigger springs urge the tube assembly inwardly of the housing.

FIGS. 3A and 3B illustrate the fully released or no-load position of the slack adjuster. Clutch member 54 is held in contact with clutch face 74 by main springs 104 and 106 which urge rod 46 inwardly]and trigger springs 96 and 98 reacting upon trigger barrel assembly 90 and clutch pins 84 and the thrust bearing assembly described. Thus, clutch member 54 is prevented from rotating on the adjusting rod, locking the slack adjuster at a fixed length.

When brake application pressure is applied through brake cylinder 10 and push rod 12, live lever 14 will pivot in a counterclockwise direction with the net result that there will be tension applied to the jaws of the slack adjuster tending to make it extend or lengthen. As the brake application pressure and hence the tension load upon the slack adjuster increases, the brake application forces will overcome the combined loads of the main springs and the trigger springs, causing clutch member 54 to break contact with opposing clutch face 74. This permits clutch member 54 to rotate upon the threaded portion of rod 46, causing the slack adjuster to extend in length. The slack adjuster will continue to extend in length as the clutch member rotates until end 92 of trigger barrel assembly 90 contacts actuator bracket 38 carried by actuator 36 in turn mounted upon actuator lever 32. This contact prevents further movement of the trigger tube assembly toward the right, as illustrated in the drawings, which in turn releases the force applied by the trigger barrel assembly upon clutch pins 102. When the clutch pins no longer load or apply a force upon clutch member 54, clutch member 54 will move against clutch face 78 on the pull rod tube assembly, thus preventing further rotation of the clutch member. At this point the slack adjuster is locked into a fixed length and further movement of push rod 12, as dictated by the brake cylinder 10, will complete the brake application force, through the slack adjuster, to the brake rigging and brake shoes.

When brake application pressure is released, the brake rigging will return toward the normal running position or brake release position and upon inward movement of the push rod of brake cylinder 10, the slack adjuster will tend to return toward its original position. When the tension load applied to opposite ends of the slack adjuster is reduced to a point where it is less than the load of main springs 104 and 106, rod 46 will be forced toward the right. Trigger barrel assembly 90 cannot move toward the right because it is still in contact with actuator bracket 38. Accordingly, clutch 54 will be moved away from clutch face 78. However, the clutch member will be prevented from contacting clutch face 74 of the pull rod tube assembly by retaining ring 82 which holds the spring washer in the position shown. The clutch member must thus rotate on the adjusting rod, causing the slack adjuster to shorten. The slack adjuster will shorten until the required movement to take up the existing slack in the brake rigging has been accomplished. The clutch member will continue to rotate and thus shorten the length of the slack adjuster until actuator bracket 36 and the actuator have moved away from the trigger barrel assembly, permitting the trigger barrel assembly to move to the right. At this point the clutch member will return to its position against clutch surface 74 and there will be no further rotation of the clutch member and the slack adjuster will be in the fully released position of FIG. 3.

At each operation of the freight car brakes the slack adjuster will first lengthen and then shorten, with the amount of shortening or slack take-up being determined by the slack in the brake rigging. The slack adjuster takes up slack in the brake rigging so that the travel or stroke of brake cylinder push rod 12 will remain within the limits prescribed by the AAR, normally an optimum operating range of 8 inches and a maximum operating distance of 12 inches. The slack adjuster described continually senses the slack in the brake rigging and takes up this slack by the described movement during the release of the car brakes.

Normally, the only occasion for slack let-out is when new brake shoes are being applied. Again, slack let-out is automatic and will take place during the brake application portion of the brake operating cycle when clutch member 54 is rotating upon the threaded portion of rod 46 prior to the time that the slack adjuster is locked up in the fully lengthened position. Slack let-out may also be done manually at the time that the new shoes are installed.

Of particular importance in the slack adjuster structure disclosed herein is the simplified operation requiring only a single clutch member which moves between two opposing clutch faces. This is in contrast with prior art slack adjusters requiring multiple spin nuts or clutch members and substantially more complex overall construction. The structure is compact and reliably operable.

Whereas the preferred form of the invention has been shown and described herein, it should be realized that there may be many modification, substitutions and alterations thereto.

The embodiments of the invention in which an exclusive property or privilege is claimed are defined as follows:

1. A railroad slack adjuster including a threaded rod, one end of which is adapted to be connected to one portion of the brake rigging, a tube telescopic with said rod and adapted to be connected to another portion of the brake rigging, a one-piece clutch member having threads for rotatably engaging said rod and integral clutch surfaces for engagement with opposing clutch surfaces on said tube, a housing telescopically positioned about said rod, tube and clutch member, spring means positioned about said tube and effective between said tube and housing and urging said tube inwardly of said housing, spring means positioned about said rod and urging said rod inwardly of said tube, brake application tension applied at opposite ends of said slack adjuster to said rod and tube causing said clutch member to move between said tube opposing clutch surfaces as the slack adjuster lets out and takes up slack in the brake rigging during brake application.

2. The slack adjuster of claim 1 further characterized in that said opposing clutch surfaces on said tube are positioned on opposite sides of said clutch member, with said clutch member being in engagement with one of said surfaces prior to a brake application force and being in engagement with the other surface when the slack adjuster has assumed a fixed length during brake application.

3. The slack adjuster of claim 2 further characterized by and including means on said housing applying a force from said first-named spring means upon said clutch member, urging it toward said one clutch surface.

4. The slack adjuster of claim 3 further characterized in that the means on said housing applying a force upon said clutch member includes a plurality of circumferentially spaced pins carried by said tube and urged by said housing toward said clutch member.

5. The slack adjuster of claim 1 further characterized in that said first-named spring means includes a plurality of coiled springs coaxially positioned about said tube and coaxially within said housing.

6. The slack adjuster of claim 1 further characterized in that said second-named spring means includes a plurality of coiled springs coaxially positioned about said rod and coaxially positioned within an extension of said tube.

7. The slack adjuster of claim 1 further characterized in that said tube extends coaxially along said rod with said first-named spring means being coaxially positioned exteriorly of said tube and said second-named spring means being coaxially positioned inside of said tube.

8. The slack adjuster of claim 7 further characterized in that said housing extends coaxially about said tube, said tube carrying a plurality of pins positioned for engagement with said clutch member, with said housing urging said pins toward said clutch member.

9. The slack adjuster of claim 8 further characterized by and including a retaining ring positioned within said tube and limiting movement of said clutch member in one direction.

* * * * *